July 10, 1956
A. F. NAYLOR
2,754,055
NAVIGATION COMPUTER
Filed April 27, 1950
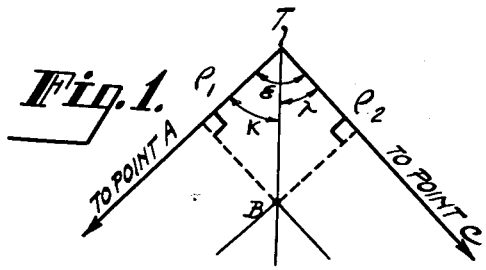
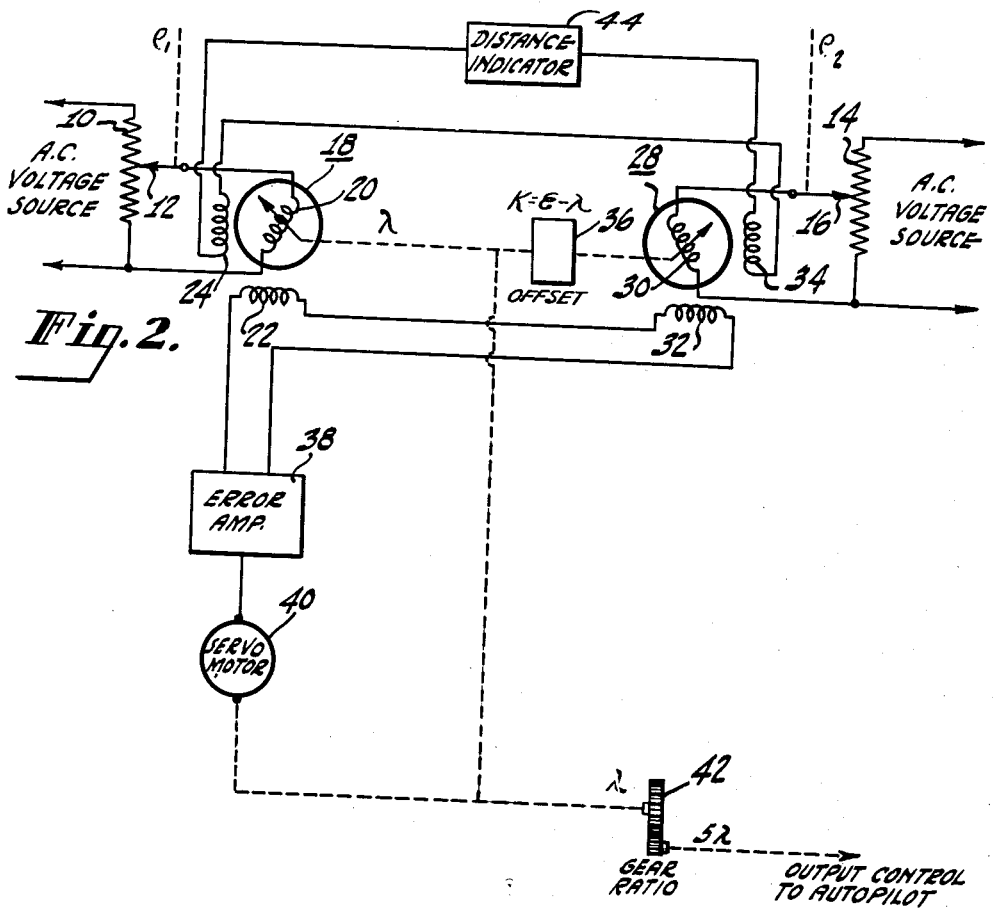
INVENTOR
ARTHUR F. NAYLOR
BY
Morris B. Rakin
ATTORNEY

United States Patent Office 2,754,055
Patented July 10, 1956

2,754,055

NAVIGATION COMPUTER

Arthur F. Naylor, Haddonfield, N. J., assignor, by mesne assignments, to the United States of America as represented by the Secretary of the Air Force Application April 27, 1950, Serial No. 158,358

3 Claims. (Cl. 235—61)

This invention relates to navigation systems and more specifically to a navigation computing system for automatically guiding a moving vehicle along a straight line path to an objective.

It is a trend of the present times to make the navigation of moving vehicles such as planes and ships as automatic and independent of human factors as possible. This places upon such navigation systems the burden of being as accurate and as reliable as possible. To achieve these ends it is desirable to make the navigation computer as simple as possible, while maintaining its accuracy, in order that there may be fewer parts which may be subject to misfunction. Another desirable feature of a navigation computer is that the information required to be supplied to it in order that it function properly should be reduced to a minimum. The more information required by a navigation computer the greater the chance for error that exists either in the obtention of such information or changes occurring in the information after the obtention thereof. Variable factors, such as wind speed, heading angle, or ground speed, are the types of information which may cause such errors. Still another desirable characteristic of a navigation computer is that it should function continuously not only to provide information as to any deviation from the desired course, but that it also provide information as to the best course for the deviated position of the vehicle.

It is an object of the present invention to provide an improved navigation computer which requires less input data than heretofore.

It is another object of the present invention to provide an improved navigation computer which does not require a computation of wind speed, heading angle, and vehicle speed.

It is still a further object of the present invention to provide an improved navigation computer which is simpler to construct than those known heretofore.

It is yet another object of the present invention to provide an improved navigation computer which can guide a moving vehicle along a straight line path to a target.

Another object of the present invention is to provide an improved navigation computer which always functions to provide information as to a straight line path between the instantaneous position of the moving vehicle and the objective.

These and other objects of the present invention are achieved by expressing the position of the moving vehicle as the coordinates along axes made by two lines drawn from two fixed points to the target. These coordinates are converted to two representative electrical voltages. Each of these voltages is impressed upon the rotor of an angle resolver. The two angle resolver rotors are ganged to be rotated together but are offset by an angle which is representative of the angle made by the two axes at their intersection at the target. The voltages induced in one of the stator windings of each of the angle resolvers are opposed to each other and their resultant is amplified and applied to the input of a servo motor. The servo motor shaft is mechanically coupled to the common shaft of the angle resolvers and also to the autopilot of the vehicle. The servo motor rotates in a direction to reduce its electrical input to substantially zero. At that time the angle made by the servo motor shaft is proportional to the angle between one of the axes and a straight line between the moving vehicle and the target. The navigation computer always functions to provide this angle and thus guide the vehicle to the target.

The novel features of the invention, as well as the invention itself, both as to its organization and method of operation will best be understood from the following description when read in connection with the accompanying drawings, in which Figure 1 is an explanatory diagram illustrating the mathematical relationships involved, and Figure 2 is a schematic diagram of an embodiment of the invention.

Radio systems are presently known and in operation wherein two transmitters, which are located at two separated points whose exact locations are known, transmit pulses in response to querying pulses from a moving vehicle. The moving vehicle is equipped with apparatus which receives the responding pulses and from a measurement of the time taken for such response provides information as to the distance of the vehicle from each of the two points. One such system is described and claimed in application Serial No. 638,387, filed December 29, 1945, now Patent No. 2,526,287 for a "Radio Navigation System" and assigned to this assignee.

Referring to Figure 1, two such transmitters are located at points A and C. A moving vehicle is at point B. The target or objective is at point T. Points A and C are assumed to be at a distance from B which is large compared with the distances in the figure and therefore points A and C do not appear in the drawing. The distances from point A to the objective T and from point C to T are known. The distance between the vehicle at B and points A and C are supplied by the radio navigation system on the vehicle such as the one identified above. When the distances between the vehicle and points A and B are large, then as a close approximation.

$$\rho_1 = AT - AB \text{ and } \rho_2 = CT - CB$$

Should increased accuracy be required for the desired objective, the exact values of $\rho_1$ and $\rho_2$ may be computed and inserted as required.

The distances $\rho_1$ and $\rho_2$ may be seen to be the coordinates of B along the axes made or defined by the lines connecting A and T and C and T. The distance between points A and C are known. Since the three sides of the triangle A, T, C are known, the angle E made by the intersection of the axes lines is known.

The equation for all straight line paths from the moving vehicle to the target BT is $$\frac{d}{dt}\left(\frac{\rho_1}{\rho_2}\right)=0$$

This is equivalent to saying that the slope of BT must be constant.

By integration $$\frac{\rho_1}{\rho_2}=k$$

where $k$ is some constant.

Suitable control can then be effected since a computer can be mechanized in such form that any changes in $\rho_1$ and $\rho_2$ which change the value of $k$ indicate that a straight line path is not being followed and compensation therefor can be readily made.

A slightly different mathematical form is more convenient and is as follows: Referring again to Figure 1, $$k = \frac{\rho_1}{\rho_2} = \frac{BT \cos K}{BT \cos \lambda}$$

$$\frac{\rho_1}{\rho_2} = \frac{\cos K}{\cos \lambda}$$

(1) $\qquad \rho_1 \cos \lambda - \rho_2 \cos K = 0$ where $K$ and $\lambda$ are the angles made by the intersection of $BT$ with the axes. Now, since $E = \lambda + K$, then, $$\rho_1 \cos \lambda - \rho_2 \cos (E - \lambda) = 0$$

A mechanization of this latter equation is shown in Figure 2. From a knowledge of $\rho_1$, $\rho_2$ and the constant angle $E$ obtained as indicated herein, the computer can continuously solve for $\lambda$, the angle between one of the axes and the straight line path of the vehicle. If $\lambda$ changes with time it indicates that the aircraft is not approaching the target on a straight line, and the amount of change can be used to indicate the magnitude of the change in heading that the aircraft should undergo.

Referring now to Figure 2, the coordinates of the vehicle or its positional information, $\rho_1$ and $\rho_2$ may be obtained from the radio navigation computer as representative shaft positions. An A.-C. voltage source is impressed across a first and second potentiometer 10, 14. The arm 12 of the first potentiometer 10 is continuously positioned proportionally to $\rho_1$. The arm 16 of the second potentiometer 14 is continuously positioned proportionally to $\rho_2$. Therefore, voltages are obtained from the potentiometer outputs which are respectively proportional to $\rho_1$ and $\rho_2$.

A first angle resolver 18 has its rotor winding 20 connected to the output of the first potentiometer 10 to receive the $\rho_1$ voltage. A second angle resolver 28 has its rotor winding 30 connected to the output of the second potentiometer 14 to receive the $\rho_2$ voltage. If the first angle resolver rotor 20 is positioned at some angle $\lambda$, a voltage proportional to $\rho_1 \cos \lambda$ is induced in the stator winding 22 with which the rotor makes the angle $\lambda$. The rotor 30 of the second angle resolver is ganged with the rotor 20 of the first angle resolver by a mechanical offset 36 at the constant angle $E$, so that the rotor 30 of the second angle resolver 28 is always positioned at an angle $K = E - \lambda$. There is then induced in the stator 32 of the second angle resolver 28 with which its rotor 30 makes the angle $K$ a voltage representative of $\rho_2 \cos (E - \lambda)$.

The two stator wingings 22, 32 are then connected in an opposing fashion. An error signal $e$ is defined so that $\rho_1 \cos \lambda - \rho_2 \cos (E - \lambda) = e$. If $e$ equals zero, the proper value of the angle $\lambda$ exists in the computer as may be seen from Equation 1 above. If $e$ does not equal zero this resultant voltage is applied to an error amplifier 38. The error amplifier output is connected to a servo motor 40 so that its direction of motion depends upon the phase of the error signal. The servomotor shaft, through suitable gearing, is mechanically coupled to the angle resolver rotors 20, 30. It operates to position the rotors so that its electrical input is made substantially equal to zero and thereby the rotors are positioned at the correct value of $\lambda$.

Any change in the value of $\lambda$ indicates that a change in the vehicle heading should be made. This is a degrees to turn or steering control type signal. In general a larger change in heading should be made than the observed change in $\lambda$. From a series of graphical solutions it has been determined that a change of heading five times the observed change in $\lambda$ is a suitable relationship. The multiplication by five is accomplished by a gear ratio 42 as shown. The output shaft can now be coupled to a steering control so that for each degree change of $\lambda$ a five-degree change in aircraft heading is made. The form of the steering control may involve a synchro comparison system or a continuously wound potentiometer comparison system, both known to the art.

This device operates in all quadrants if a negative value for a coordinate is represented by an alternating voltage of the opposite phase and the angle $K$ is considered as positive increasing in a counterclockwise direction from $\rho_1$ and the angle $\lambda$ is considered as positive increasing in a clockwise direction from $\rho_2$.

It can be shown that $$\rho_1 \sin \lambda + \rho_2 \sin K = BT \sin E$$

Since $\rho_1 \sin \lambda$ and $\rho_2 \sin K$ are available as representative voltages in the stator windings 24, 34 of the first and second angle resolvers which are in quadrature with the respective stator windings in which the cosine voltages are induced, the system is also utilizable to provide a voltage proportional to the distance from the target. The two stator windings are connected so that their outputs are added and this resultant voltage may be applied to a calibrated meter 44 or distance indicator.

Since the coordinate information which is applied to the navigation computer is in a ground based system, wind speed and speed of the vehicle are taken into account automatically by the computer. The system described herein may be used in aircraft to control them on the yaw axis. It may also be used to control the aircraft on the pitch axis in a dive upon a target. The coordinates $\rho_1$ and $\rho_2$ along the axes may be formed by perpendiculars to the axes as shown, or by lines to each axis, such lines being parallel to the other axis. The closer to the target the vehicle progresses, the more accurate the navigation computer becomes. Obtention of the coordinate information as to the position of the moving vehicle has been herein described as being obtained from a particular type of well-known radio navigation system. It will be readily appreciated by those well skilled in the art that such coordinate information may be obtained from other systems than radio navigation systems. Any system which continuously provides such information may be used.

It will also be readily appreciated that not only can the embodiment of the invention herein described be used to furnish information as to the deviation of the vehicle from its course, but with the coordinate information of the vehicle's deviated position being supplied a new straight line path to the target is also indicated.

From the foregoing description it will be readily apparent that an improved navigation system is provided for guiding a moving vehicle along a straight line path to a target. This improved navigation computer requires very little input data, operates continuously independently of the wind speed, vehicle heading angle, or vehicle speed and is simpler to construct than those heretofore. Although a single embodiment of the present invention has been shown and described, it should be apparent that many changes may be made in the particular embodiment herein disclosed and that many other embodiments are possible, all within the spirit and scope of the invention. It is therefore desired that the foregoing shall be taken as illustrative and not as limiting.

What is claimed is:

1. A system for guiding a moving vehicle to a target from information as to the position of said vehicle expressed as the coordinates referred to the two axes defined by two lines drawn from two fixed points to said target and a first angle included between said two axes, said system comprising means to generate a first voltage representative of one of said coordinates, means to generate a second voltage representative of the other of said coordinates, first angle resolver means coupled to said first voltage-generating means to generate a third voltage representative of the product of said one of said coordinates and the cosine of a second angle, second angle resolver means coupled to said second voltage-generating means to generate a fourth voltage representative of said other of said coordinates and the cosine of the difference between said first angle and said second angle, coupling means to maintain said first and second angle resolver means offset from each other by said first angle, means to combine said third and fourth voltages, and servo means responsive to the resultant of said combined voltages to control said first and second angle resolver means to substantially eliminate said resultant whereby said second angle is the angle between the straight line path between said vehicle and said target and one of said coordinate axes.

2. A system for guiding a moving vehicle to a target from the positions of two shafts representative of the two coordinates of the position of said vehicle referred to the two axes defined by two lines drawn from two fixed points to said target and a mechanical offset proportional to a first angle included between said two axes, said system comprising first and second potentiometric means coupled to said two shafts to generate first and second voltages proportional to said two coordinates, first and second angle resolvers each including a rotor winding and a pair of stator windings, said rotor windings being offset from each other by said mechanical offset proportional to said angle included between said two coordinate lines and being mechanically coupled to be rotatable simultaneously, means to impress said first voltage on one of said rotor windings and said second voltage on the other of said rotor windings, means to combine the voltages induced in a given one of each of said pair of stator windings to provide a resultant voltage, and servo motor means responsive to said resultant voltage and mechanically coupled to said rotor windings to rotate said rotor windings until said resultant voltage is substantially eliminated, whereby said servo motor shaft is positioned at an angle proportional to the angle between the straight line path between said vehicle and said target and one of said coordinate axes.

3. A system for guiding a moving vehicle to a target from information as to the position of said vehicle expressed as two coordinates referred to the axes defined by two lines drawn from two fixed points to said target, said two coordinates being respectively represented as a first and a second voltage, and a first angle included between said two axes, said system comprising first and second angle resolvers each having rotor windings, means to continuously maintain said rotor windings at an offset angle equal to said first angle, means to apply said first voltage to said first angle resolver, means to apply said second voltage to said second angle resolver, means to derive from said first angle resolver a third voltage representative of the product of the first of said two coordinates and the cosine of a second angle, means to derive from said second angle resolver a fourth voltage representative of the product of the other of said coordinates and the cosine of the difference between said first and second angle, means to combine said third and fourth voltages to produce a resultant voltage, and means responsive to said resultant voltage to adjust the position of said first and second angle resolver rotor windings until said resultant voltage is substantially zero, whereby said first angle resolver rotor is positioned at a second angle which substantially equals the angle included between said moving vehicle and one of said coordinates.

References Cited in the file of this patent
UNITED STATES PATENTS

| | | |
|---|---|---|
| 2,443,624 | Lovell et al. | June 22, 1948 |
| 2,444,171 | Sanders | June 29, 1948 |
| 2,472,129 | Streeter | June 7, 1949 |
| 2,513,738 | Noxon | July 4, 1950 |
| 2,516,641 | Murphy | July 25, 1950 |
| 2,560,527 | Dehmel | July 10, 1951 |
| 2,569,328 | Omburg | Sept. 25, 1951 |

OTHER REFERENCES

"Electronic Instruments"; I. A. Greenwood, Jr., et al., vol. 21, M. I. T. Radiation Lab Series; McGraw-Hill, 1948; Fig. 6.26, page 163 relied upon.